(12) United States Patent
Robertson et al.

(10) Patent No.: US 7,607,576 B2
(45) Date of Patent: Oct. 27, 2009

(54) LOCAL ZONE SECURITY ARCHITECTURE FOR RETAIL ENVIRONMENTS

(75) Inventors: Philip A. Robertson, Greensboro, NC (US); Chris Whitley, Greensboro, NC (US); Simon Huang Seng Siew, Greensboro, NC (US); Timothy M. Weston, Greensboro, NC (US); Victor C. Turner, Summerfield, NC (US); Ken Ringeman, Kernersville, NC (US); Greg K. Hampson, Reidsville, NC (US); Tyrone Aiken, Greensboro, NC (US); Giovanni Carapelli, Florence (IT); Giorgio Carozzini, Pontassieve (IT)

(73) Assignee: Gilbarco, Inc., Greensboro, NC (US)

( * ) Notice: Subject to any disclaimer, the term of this patent is extended or adjusted under 35 U.S.C. 154(b) by 673 days.

(21) Appl. No.: 11/064,526

(22) Filed: Feb. 23, 2005

(65) Prior Publication Data

US 2005/0211766 A1 Sep. 29, 2005

Related U.S. Application Data

(60) Provisional application No. 60/548,254, filed on Feb. 27, 2004.

(51) Int. Cl.
*G06K 15/00* (2006.01)
*G06F 17/00* (2006.01)
*G06K 5/00* (2006.01)

(52) U.S. Cl. .................. 235/383; 235/375; 235/380; 235/381

(58) Field of Classification Search ......... 235/380–384, 235/375; 705/16–18, 35, 39, 41, 44
See application file for complete search history.

(56) References Cited

U.S. PATENT DOCUMENTS

| | | | |
|---|---|---|---|
| 4,661,658 A | 4/1987 | Matyas | 380/23 |
| 5,228,084 A | 7/1993 | Johnson et al. | 380/23 |
| 5,384,850 A | 1/1995 | Johnson et al. | 380/52 |
| 5,448,638 A | 9/1995 | Johnson et al. | 380/23 |
| 5,721,781 A | 2/1998 | Deo et al. | 380/25 |
| 5,790,410 A | 8/1998 | Warn et al. | 364/479.02 |
| 5,859,779 A * | 1/1999 | Giordano et al. | 700/231 |
| 6,078,888 A | 6/2000 | Johnson, Jr. | 705/1 |
| 6,092,629 A * | 7/2000 | Bohnert et al. | 186/53 |
| 6,185,307 B1 | 2/2001 | Johnson, Jr. | 380/270 |
| 6,578,145 B1 | 6/2003 | Greene | 713/182 |
| 6,736,313 B1 | 5/2004 | Dickson | 235/380 |
| 2001/0056402 A1* | 12/2001 | Ahuja et al. | 705/43 |
| 2002/0038287 A1* | 3/2002 | Villaret et al. | 705/41 |
| 2006/0108413 A1* | 5/2006 | Demere | 235/380 |

* cited by examiner

*Primary Examiner*—Thien M. Le
*Assistant Examiner*—April A Taylor
(74) *Attorney, Agent, or Firm*—Nelson Mullins Riley & Scarborough LLP

(57) ABSTRACT

A security architecture for a retail environment providing both on-line and off-line personal identification number (PIN) validation for a smart card transaction using a reduced number of secure access modules (SAMs). In one embodiment, the retail environment includes and security module and numerous fuel dispensers each including a controller and one or more PINpads and card readers. The security module includes one or more SAMs for off-line PIN validation. Each of the PINpads communicates with the security module, and the security module performs either on-line or off-line PIN validation for every PINpad in the retail environment. Accordingly, the security module uses one set of SAMs for off-line validation for every PINpad in the retail environment.

72 Claims, 6 Drawing Sheets

US 7,607,576 B2

LOCAL ZONE SECURITY ARCHITECTURE FOR RETAIL ENVIRONMENTS

RELATED APPLICATION

This patent application claims priority to previously filed U.S. Provisional patent application No. 60/548,254, filed on Feb. 27, 2004, and incorporated herein by reference in its entirety.

FIELD OF THE INVENTION

The present invention relates to a security architecture for retail environments, and more particularly relates to a security architecture for a retail environment having multiple card readers and PINpads and that provides both on-line and off-line PIN validation using a reduced number of secure access modules.

BACKGROUND OF THE INVENTION

FIG. 1 illustrates a typical implementation of a self-service terminal (SST) 10 designed to meet the Europay MasterCard Visa (EMV) specification. The EMV specification is an agreed specification between Europay, MasterCard, and Visa for the acceptance of smart chip cards and the handling of PIN data for credit and debit schemes. The objectives of the EMV specification are to reduce fraud, allow off-line secure transactions, allow issuers of the smart chip cards to change card parameters after issuance, and allow multi-application cards.

The SST 10 includes a controller 12, a Personal Identification Number (PIN) pad 14, and a hybrid card reader 16 including one or more secure access modules (SAMs). The hybrid card reader 16 is a combination magnetic stripe card reader and a smart card reader. A smart card is a type of credit or debit card that contains a microchip having a significant amount of memory for storing various card parameters, which may include a user's PIN. Each of the SAMs included in the card reader 16 contain proprietary information and operate to provide off-line PIN validation for a particular application.

In operation, a customer's smart card is read by the card reader 16, and the customer enter his PIN into the PINpad 14. The PINpad 14 encrypts the PIN and communicates the encrypted PIN to the controller 12. The controller 12 passes the encrypted PIN to the card reader 16. For off-line validation, the card reader 16 decrypts the PIN using a local key compatible the key used by the PINpad 14 to encrypt the PIN, and the card reader 16 communicates the PIN to the SAMs for validation. Off-line validation allows verification of the customer's PIN on-site without communicating with a remote system. For on-line validation, the controller 12 decrypts the PIN using a local key compatible the key used by the PINpad 14 to encrypt the PIN, and after decrypting the PIN, the card reader 16 encrypts the PIN using a stored bank key and communicates the PIN encrypted using the bank key to a host computer via the POS 18 for PIN validation.

The SAMs are incorporated into the card reader 16, and the card reader 16 must include a different SAM for each application that the SST 10 is required to support. Accordingly, if an operator installs more than one SST 10 in a retail environment, the operator must purchase a set of SAMs for each card reader 16. Further, the SST 10 is an expensive tamper-resistant unit. When one of the controller 12, PINpad 16, or card reader 16 is faulty, alternative embodiments may require the replacement of the entire SST 10. Since the SST 10 is expensive, it is not desirable to replace the entire SST 10 when only one component is faulty.

Thus, there remains a need for a retail environment that eliminates the need for a complete set of SAMs for each card reader. There also remains a need for a self-service terminal that eliminates the need to replace the entire terminal when a single component is faulty.

SUMMARY OF THE INVENTION

The present invention provides a security architecture for a retail environment providing both on-line and off-line personal identification number (PIN) validation for a smart card transaction using a reduced number of secure access modules (SAMs). In one embodiment, the retail environment includes a security module and numerous fuel dispensers. However, the retail environment could be an environment other than a fueling environment. Each of the fuel dispensers includes a controller and one or more PINpads and card readers. The security module includes one or more SAMs for off-line PIN validation. Each of the PINpads in each of the fuel dispensers communicates with the security module such that the security module performs either on-line or off-line PIN validation for every PINpad in the retail environment. Accordingly, the security module uses one set of SAMs for off-line validation for every PINpad in the retail environment. Further, the security module stores a set of bank keys used to encrypt PINs for on-line validation by a remote host computer. Accordingly, the security module uses one set of bank keys for on-line validation for every PINpad in the retail environment.

In one embodiment, each of the fuel dispensers also includes one or more displays, and the controller operates to logically control the displays. More specifically, when the PINpad enters a nonsecure mode of operation to allow a customer to enter alphanumeric information other than a PIN, the controller operates to control the display such that only predefined messages can be displayed. Accordingly, the situation wherein the customer is tricked into entering his PIN while the PINpad is in a nonsecure mode of operation is prevented.

In one embodiment, communication between the security module and each of the PINpads and between the controller and the card reader is encrypted based on keys generated in numerous local zone sessions. Local zone sessions are initiated between the security module and each of the PINpads. Each of these local zone sessions generates a key used by a corresponding PINpad to encrypt a customer's PIN prior to communicating the PIN to the security module for validation. In each fuel dispenser, local zone sessions are also initiated between the controller and each card reader to generate different keys for encrypted communication between the controller and each of the card readers. In one embodiment, the local zone sessions use an exponential key exchange to generate the corresponding key. The keys may be used to encrypt information using any number of encryption algorithms including, but not limited to, Rivest-Shamir-Adelman algorithm (RSA), the Diffie-Hellman algorithm (DH), the Data Encryption Standard (DES), or one or more of the RSA, DH, and DES algorithms. In one embodiment, the communications may be encrypted using DES using a unique key per transaction (UKPT) or a Master key and a Session key.

A second embodiment of the present invention provides a retail environment including numerous fuel dispensers each including a self-service terminal (SST) including a controller and two or more PINpads and card readers. The controller includes one or more SAMs for off-line PIN validation and one or more bank keys for on-line PIN validation rather than the SAMs being provided outside the fuel dispenser in a separate security module. Each of the PINpads in the fuel dispenser communicates with the controller such that the controller performs either on-line or off-line PIN validation for every PINpad in the fuel dispenser. Further, the controller stores one set of bank keys used to encrypt PINs for on-line validation by a remote host computer. Accordingly, the controller uses the one set of bank keys for on-line validation for every PINpad in the fuel dispenser.

In one embodiment, each of the fuel dispensers also includes one or more displays, and the controller operates to logically control the displays. More specifically, when the PINpad enters a nonsecure mode of operation such that a customer can enter alphanumeric information other than a PIN, the controller operates to control the display such that only predefined messages can be displayed. Accordingly, the situation wherein the customer is tricked into entering his PIN while the PINpad is in a nonsecure mode of operation is prevented.

In one embodiment, communication between the controller and each of the PINpads and card readers is encrypted based on keys generated in numerous local zone sessions. Local zone sessions are initiated between the controller and each of the PINpads and card readers. Each of these local zone sessions generates a key used by a corresponding PINpad or card reader and the controller for encrypted communication. In one embodiment, the local zone sessions use an exponential key exchange (EKE) to generate the corresponding key. The keys may be used to encrypt information using any number of encryption algorithms including, but not limited to, Rivest-Shamir-Adelman algorithm (RSA), the Diffie-Hellman algorithm (DH), the Data Encryption Standard (DES), or one or more of the RSA, DH, and DES algorithms. In one embodiment, the communications may be encrypted using DES using a unique key per transaction (UKPT) or a Master key and a Session key.

In either embodiment, at least the card readers and PINpads are modular components such that a faulty card reader or PINpad can be replaced without replacing the card readers, PINpads, and controller. Further, each of the card readers, PINpads, and the security module are tamper-evident components.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a security architecture for a retail environment, such as a fueling environment, providing both on-line and off-line personal identification number (PIN) validation for a smart card transaction using a reduced number of secure access modules (SAMs). Although the following description focuses on a fueling environment, it should be understood that the retail environment of the present invention can be any retail environment, and the description of the present invention in a fueling environment should be considered exemplary rather than limiting.

Figure 2:
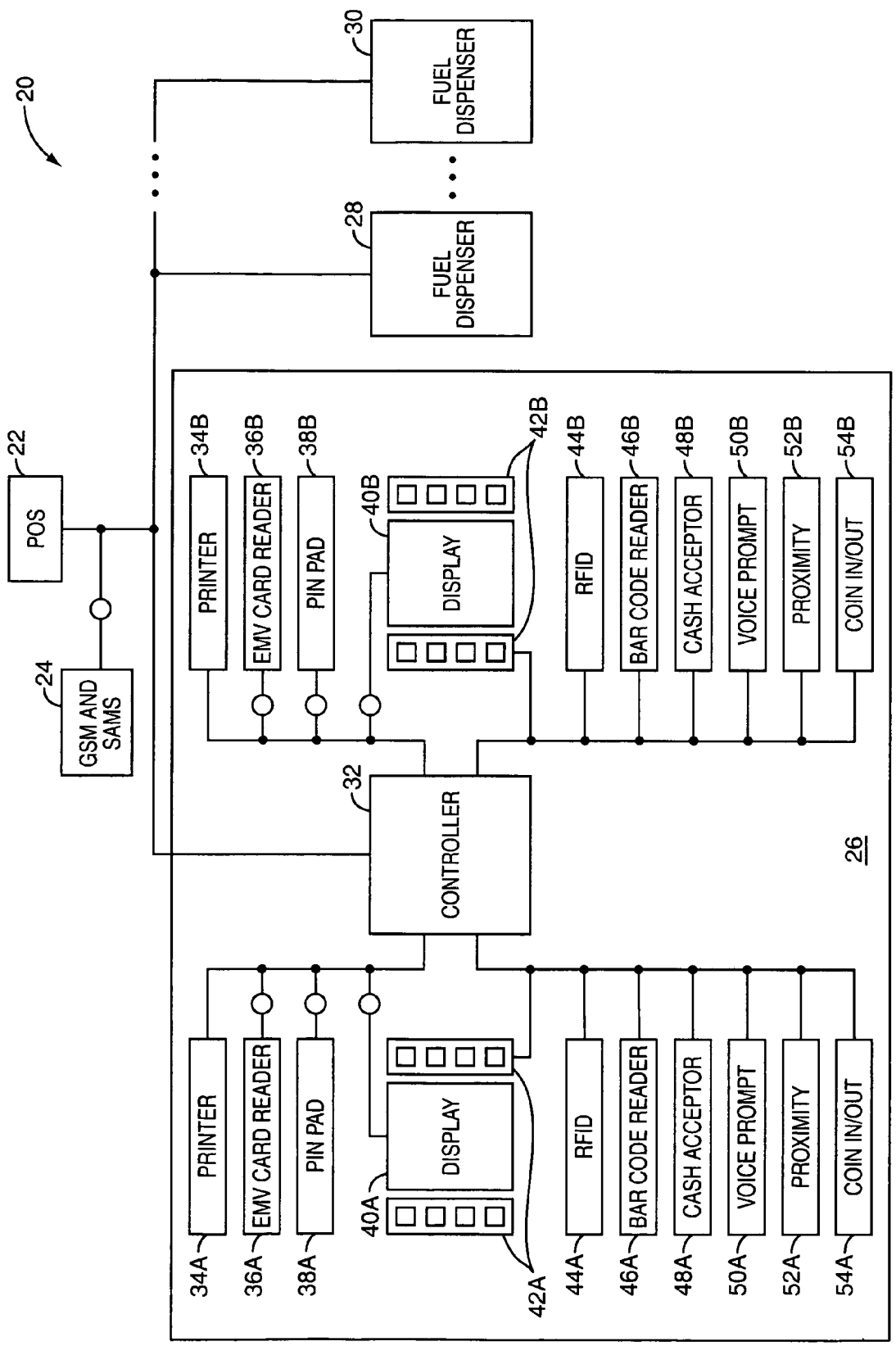
FIG. 2 illustrates a fuel dispensing environment having a security module including a single set of SAMs and bank keys that serves all fuel dispensers in the fueling environment according to one embodiment of the present invention.

FIG. 2 illustrates a fueling environment 20 according to one embodiment of the present invention. The fueling environment 20 includes a point-of-sale (POS) 22, a security module 24, and a plurality of fuel dispensers 26-30. Only the fuel dispenser 26 is illustrated in detail. However, it should be understood that the following discussion of the fuel dispenser 26 equally applies to all of the fuel dispensers 26-30.

The fuel dispenser 26 is a two-sided fuel dispenser and includes a first side, a second side, and a common controller 32 controlling each component on the first and second sides. The first and second sides include printers 34A and 34B, card readers 36A and 36B, PINpads 38A and 38B, displays 40A and 40B, and soft keys 42A and 42B. The card readers 36A and 36B may be capable of reading both magnetic stripe cards and smart cards or alternatively be capable of reading only smart cards. The first and second sides may also include radio frequency identification circuitries (RFID) 44A and 44B, bar code readers 46A and 46B, cash acceptors 48A and 48B, voice prompt circuitries 50A and 50B, proximity detectors 52A and 52B, and coin acceptors and dispensers 54A and 54B.

The security module 24 includes one or more secure access modules (SAMs). The SAMs may be part of the security module 24 or may be connected to the security module 24 via a secure interface. The SAMs provide fraud protection and control for various applications using a smart card. The SAMs also allow the security module 24 to perform off-line validation of a customer's PIN based on data read from the customer's smart card. Further, since different smart card applications, such as customer loyalty programs and credit and debit card applications require different processing methods or standards, the security module 24 includes numerous SAMs. Each SAM stores proprietary information necessary to validate a PIN associated with a smart card and match the smart card to a particular application. By using multiple SAMs, the retail environment 20 can implement a variety of smart card-based programs at the same time. For example, one of the SAMs may be used to support Visa credit cards, a second SAM may be used for MasterCard credit cards, a third SAM may be used to handle gift cards, and a fourth SAM may be used to implement a frequent shopper program.

Figure 3:
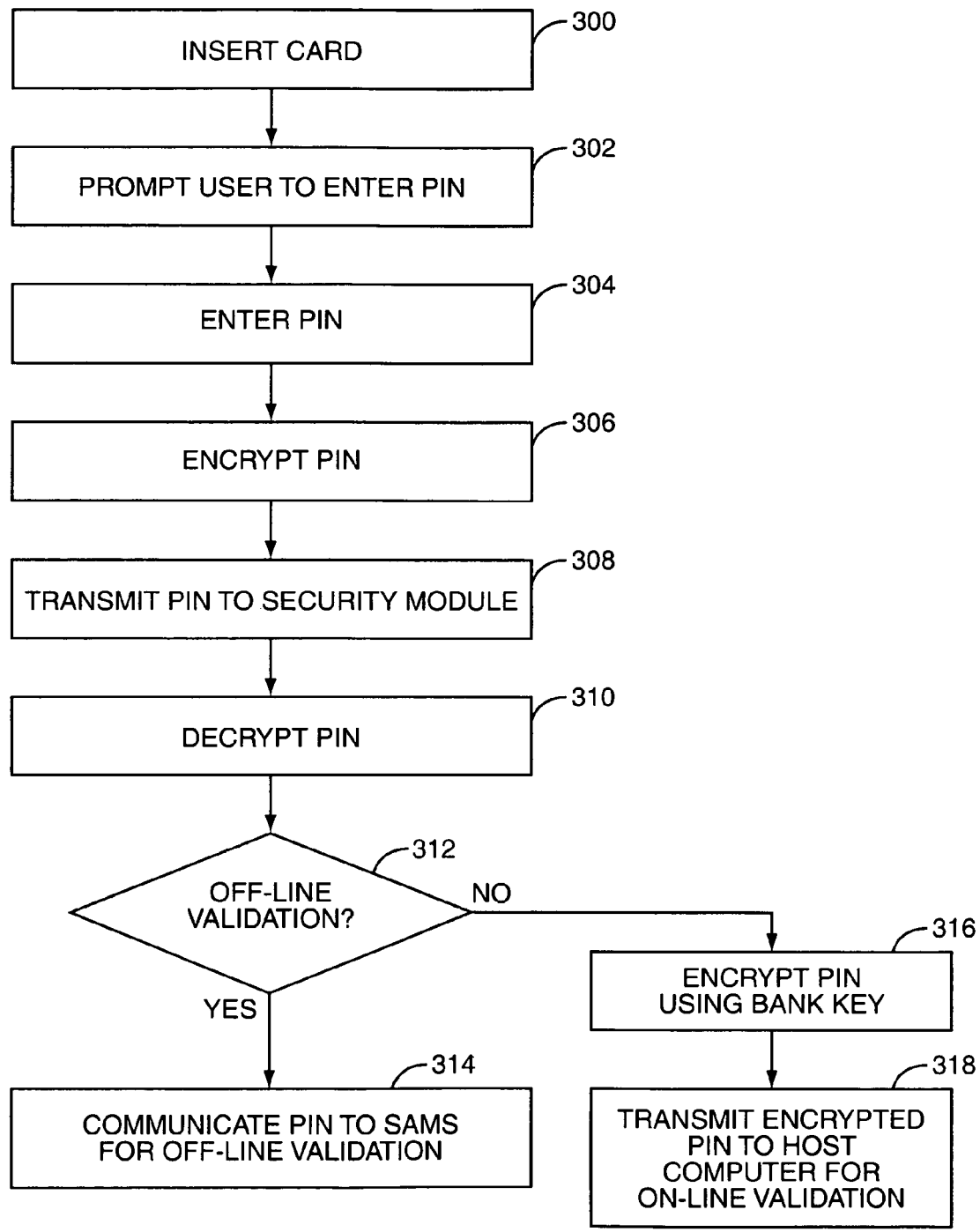
FIG. 3 is a flow chart illustrating the operation of the fuel dispensing environment of FIG. 2 according to one embodiment of the present invention.

As illustrated in FIG. 3, in operation, assuming a customer is purchasing fuel on the first side of the fuel dispenser 26, the customer inserts his smart card into the card reader 36A (step 300). The controller 32 then prompts the user to enter his PIN by displaying text on the display 40A or using the voice prompt 50A or using both (step 302). The customer then enters his PIN using the PINpad 38A (step 304). As described below in more detail, the PINpad 38A encrypts the PIN (step 306) and communicates the encrypted PIN to the security module 24 (step 308) via the controller 32 and the POS 22. It should be noted that, in this embodiment, neither the controller 32 or the POS 22 decrypts the PIN. The POS 22 and the controller 32 simply act as gateways to establish a communication path between the PINpad 38A and the security module 24.

Once the security module 24 receives the encrypted PIN, it decrypts the PIN (step 310). The security module 24 determines whether to perform off-line validation or on-line validation of the PIN (step 312). For off-line validation, the security module 24 communicates the PIN to the SAMs for validation based on data read from the smart card by the card reader 36A (step 314). Each of the SAMs contains proprietary information for a particular application. The proprietary information allows the SAM to validate the PIN without communicating to a remote host computer. Thus, the SAMs allow the PIN to be validated on-site rather than at a remote host computer. For on-line validation, after decrypting the PIN, the security module 24 encrypts the PIN using a corresponding stored bank key (step 316) and communicates the PIN encrypted using the bank key to a host computer (not shown) via the POS 22 for on-line validation based on data read from the smart card by the card reader 36A (step 318).

Referring back to FIG. 2, it should be noted that the retail environment 20 of FIG. 2 requires only one set of SAMs and one set of stored bank keys. In this embodiment, the SAMs are either incorporated into or securely interfaced to the security module 24, and the bank keys are stored by the security module. In other words, the retail environment 20 avoids the need for a different set of SAMs for each of the PINpads 38A and 38B in each of the dispensers 26-30 and also avoids the need for storing the bank keys in each of the PINpads 38A and 38B in each of the dispensers 26-30.

In one embodiment, communication between the security module 24 and the PINpads 38A and 38B and communication between the controller 32 and the card readers 36A and 36B utilize an encryption scheme similar to that disclosed in commonly owned U.S. Pat. No. 5,384,850, entitled "SECURITY APPARATUS AND SYSTEM FOR RETAIL ENVIRONMENTS, issued Jan. 24, 1995, which is incorporated herein by reference in its entirety. However, this embodiment is exemplary. Numerous other encryption schemes for encryption and encryption key generation, such as but not limited to PGP, will be apparent to one of ordinary skill in the art upon reading this disclosure.

In general, whenever it is desirable to generate encryption keys, local zone sessions are initiated between various components. Each of the local zone sessions generates an encryption key in the manner described in U.S. Pat. No. 5,384,850. A local zone session between the security module 24 and the first PINpad 38A generates a first encryption key for encrypted communication between the security module 24 and the first PINpad 36A. In one embodiment, the local zone session uses an exponential key exchange between the security module 24 and the first PINpad 36A to generate the first encryption key. In a similar fashion, a local zone session is initiated between the security module 24 and the second PINpad 38B in order to generate a second encryption key for encrypted communication between the security module 24 and the second PINpad 38B. The controller 32 and the POS 22 act as gateways to establish a communication path between the security module 24 and the first and second PINpads 38A and 38B.

Local zone sessions are also initiated between the controller 32 and each of the card readers 36A and 36B, thereby establishing encryption keys for encrypted communication between the controller 32 and each of the card readers 36A and 36B. The encryption keys generated during the local zone sessions may be used to encrypt communications using any number of encryption algorithms including, but not limited to, Rivest-Shamir-Adelman algorithm (RSA), the Diffie-Hellman algorithm (DH), the Data Encryption Standard (DES), or one or more of the RSA, DH, and DES algorithms. In one embodiment, the communications may be encrypted using DES using a unique key per transaction (UKPT) or a Master key and a Session key.

Figure 4:
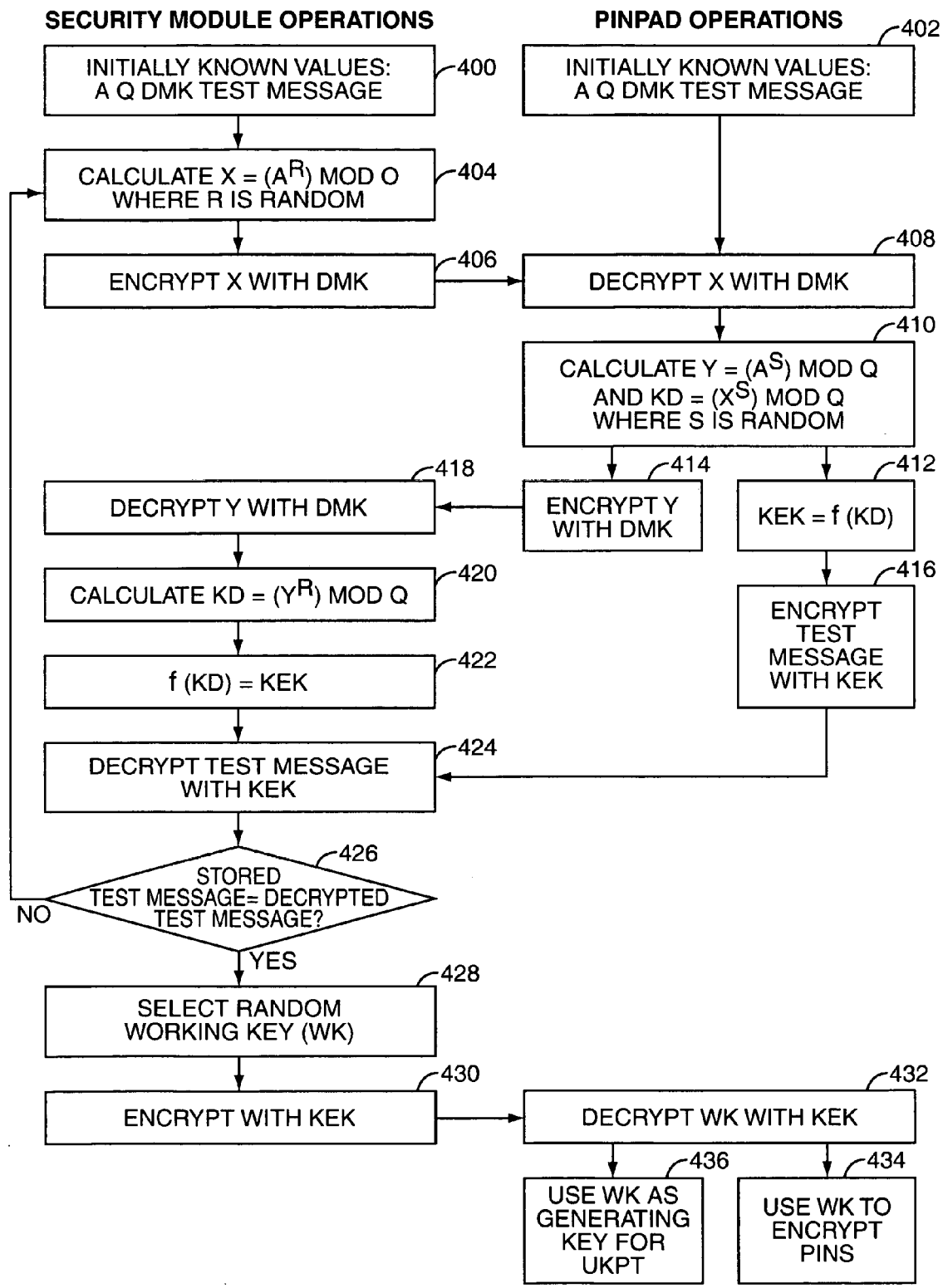
FIG. 4 is a flow chart illustrating an exemplary local zone session between the security module and a PINpad of FIG. 2 for generating an encryption key according to one embodiment of the present invention.

As an example, FIG. 4 is a flow chart illustrating a local zone session between the security module 24 and the PINpad 38A. The local zone session is based on several values, namely the values A, Q, a test message and a default master key, that are initially loaded into both the security module 24 and the PINpad 38A (steps 400 and 402). The values A and Q are large prime numbers. None of these values need to be stored on a secure basis, since even knowledge of all four will not assist an interloper in determining the actual encryption keys which will be used to encrypt the PIN numbers. The security module 24 first selects a large random number R and calculates the value $$X = \text{Mod } Q (A^R),$$

where the Mod function returns the integer remainder after long division (step 404). That is X is equal to the remainder when A to the R power is divided by Q. The value of X is then encrypted by the security module 24 using the default master key (step 406). The encrypted value X is then sent to the POS 22, and the POS sends it to the PINpad 38A via the controller 32. The PINpad 38A decrypts X with the default master key (step 408). Then, in step 410, the PINpad 38A selects a random number S and calculates $$Y = (A^S) \text{ Mod } Q,$$

and $$KD = (X^S) \text{ Mod } Q.$$

The PINpad 38A then calculates a Key Exchange Key (KEK) from the value KD (412). This calculation may involve any desired suitable function f( ) so as to produce KEK as a 64 bit DES key. Several methods can be used in f( ), including truncation and exclusive 'or' ing parts of KD together.

The PINpad 38A then encrypts Y with the default key (step 414) and encrypts the test message using the DES algorithm with KEK used as the encryption key (step 416). Both the encrypted Y and the encrypted test message are returned to the POS 22 which in turn sends this data to the security module 24.

The security module 24 decrypts Y with the default key (step 418) and then, in step 420, calculates $$KD = (Y.\sup R) \bmod Q.$$

The security module 24 then calculates the KEK from the value KD, using the same function f( ) previously used by the PINpad 38A (step 422). Using the value KEK, the security module 24 then decrypts the test message which was encrypted by the PINpad 38A with the KEK (step 424).

The security module 24 then determines if the test message matches the stored value (step 426). If the test message does not match the stored value, the security module 24 selects a new random number R and calculates a new $$X = (A.\sup R) \bmod Q$$

to start the process over again. If the decrypted test message matches the test message stored within the security module 24, then the security module 24 continues with the setup process, because the PINpad 38A and the security module 24 have calculated the same KEK. The KEK values in the PINpad 38A and the security module are equal, not only as confirmed by identity in the test messages, but also because the values of KEK calculated are mathematically equivalent:

$$((A.\sup R) \bmod Q).\sup S \bmod Q = (A.\sup R*S) \bmod Q = (A.\sup S*R) \bmod Q = ((A.\sup S) \bmod Q).\sup R \bmod Q.$$

The security module 24 then selects a randomly or pseudo randomly generated working key, WK, (step 428) encrypts it with the KEK (step 430) and sends it to the POS 22 which then sends it to the correct PINpad 38A. The PINpad 38A decrypts the working key with the KEK (step 432). Depending on the desired mode of operation, the PINpad 38A may use WK as an encrypting key in any of various encryption methods (i.e. DES, UKPT, RSA, etc.) whenever a PIN number is to be encrypted (steps 434 and 436)).

As long as the PINpad 38A and security module 24 retain the KEK, it is not changed, but the encryption (working) keys between the security module 24 and the PINpad 38A may be changed regularly in response to specific system events or on a timed basis. The KEK's may change for various reasons: cold starting a dispenser (clearing all of its memory data storage); replacing the PINpad 38A or the security module 24; or replacing the hardware or software of the POS 22.

The generation of the KEK's may also be accomplished by algorithms other than exponential key exchange.

Again referring back to FIG. 2, to further ensure the security of PINs entered via the PINpads 38A and 38B, the controller 32 logically controls the operation of the displays 40A and 40B. More specifically, the controller 32 logically controls what can be displayed on the displays 40A and 40B and when text or graphics can be displayed. In one embodiment, the controller 32 controls the displays 40A and 40B such that only predefined text or graphics can be displayed on the displays 40A and 40B when the corresponding PINpad 38A or 38B is operating in an unsecure mode. The PINpads 38A and 38B may operate in an unsecure mode such that a customer can enter alphanumeric information other than a PIN into the PINpads 38A and 38B. When the PINpad 38A or 38B is in the unsecure mode, the alphanumeric information entered is not encrypted such that the controller 32 can use the information. In order to prevent a situation where a customer is tricked into entering his PIN when the PINpad 38A or 38B is in the unsecure mode, the controller 32 controls the corresponding display 40A or 40B such that only predefined messages can be displayed.

Figure 1:
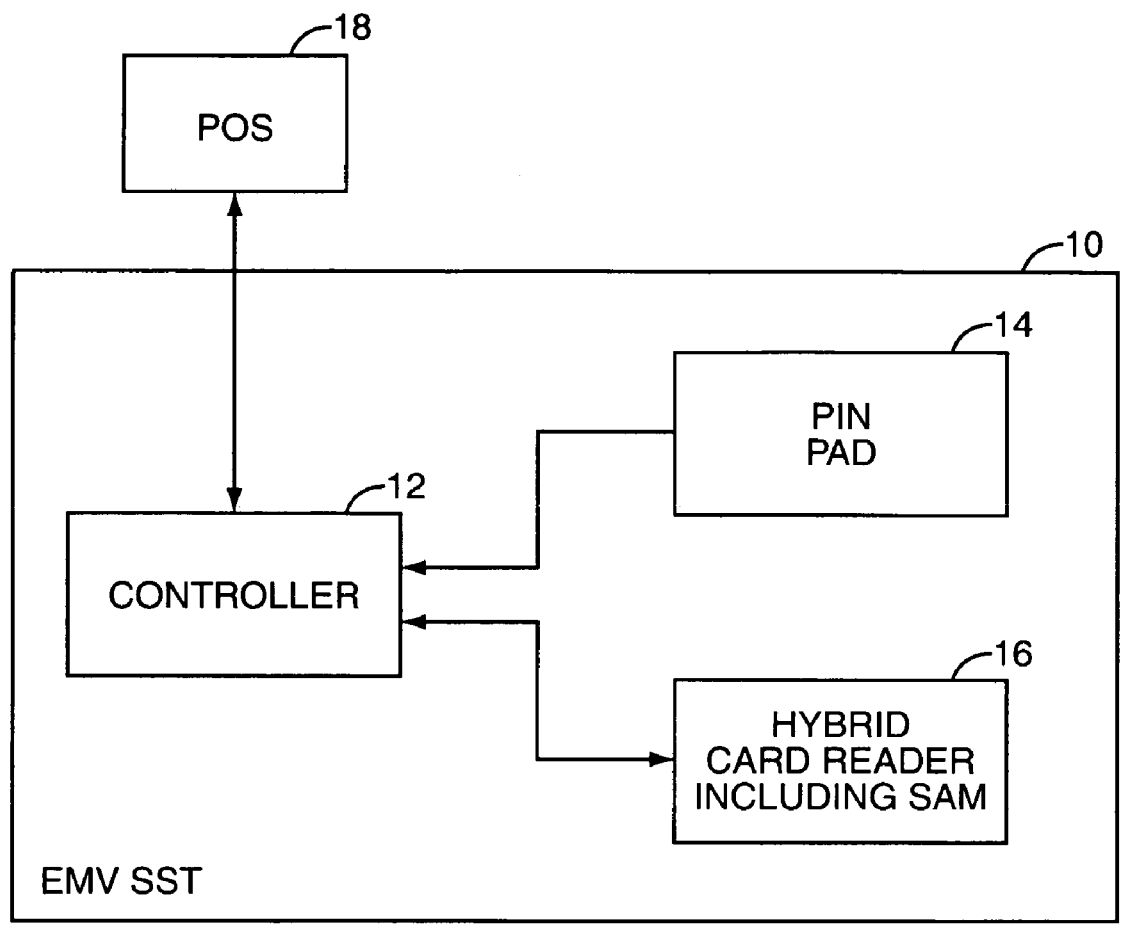
FIG. 1 illustrates a typical self-service terminal having a PINpad including a number of secure access modules (SAMs) for off-line validation of a user's PIN.

In one embodiment, the card readers 36A and 36B, the PINpads 38A and 38B, and the displays 40A and 40B are modular components. Thus, unlike the SST 10 of FIG. 1, any of the card readers 36A and 36B, the PINpads 38A and 38B, and the displays 40A and 40B can be replaced without replacing all of the components, thereby substantially decreasing expense when there is a failure in one of the card readers 36A and 36B, the PINpads 38A and 38B, or the displays 40A and 40B. In another embodiment, all of the components 34-54 are modular components.

It should also be noted that the card readers 36A and 36B, the PINpads 38A and 38B, and security module 24 are tamper-evident components. Further, the security module 24 may comprise a tamper-proof enclosure like the enclosure of the security module disclosed in U.S. Pat. No. 5,384,850.

Figure 5:
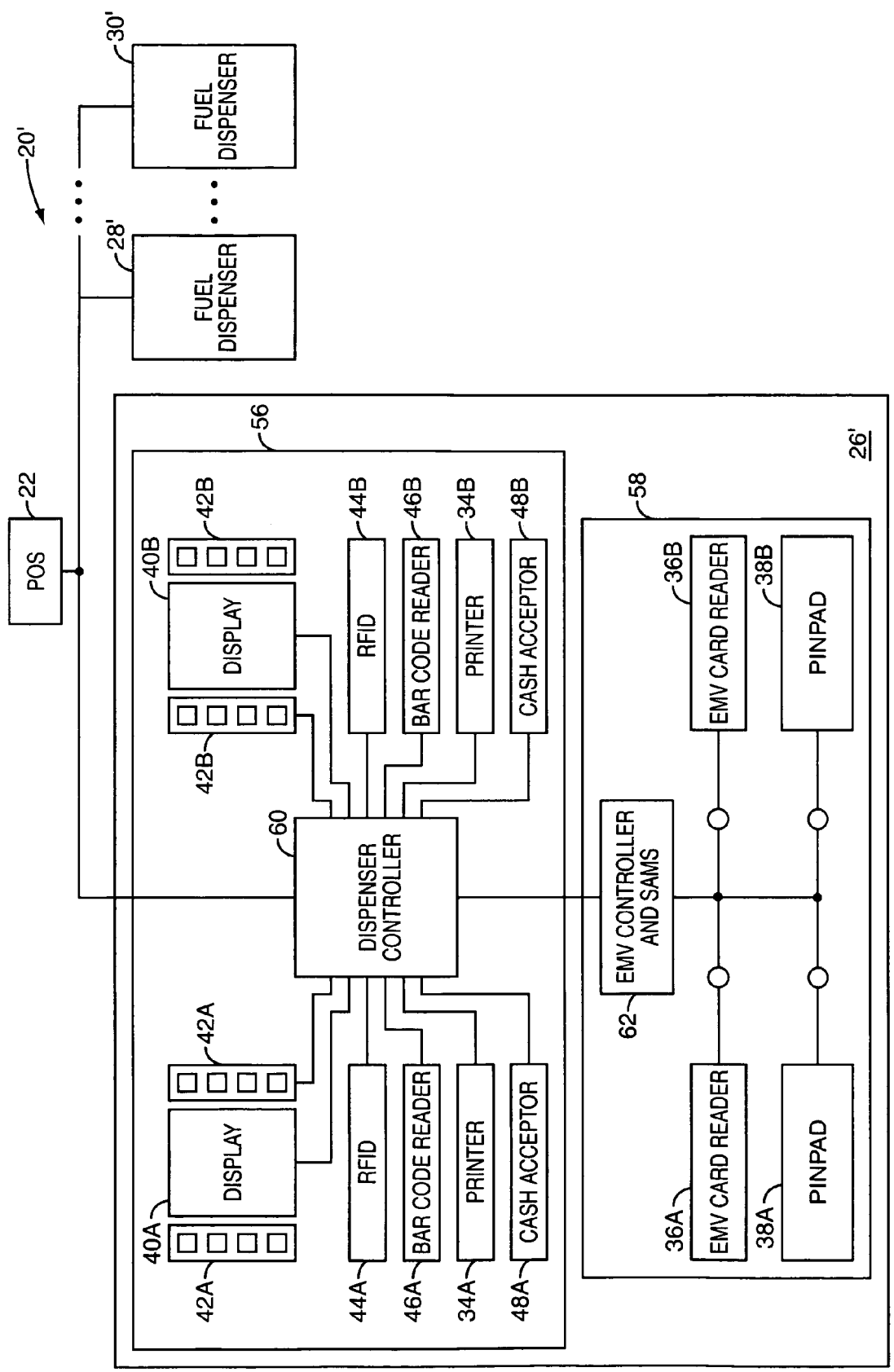
FIG. 5 illustrates a fuel dispensing environment including numerous two sided fuel dispensers each including two PINpads and a controller providing on-line and off-line PIN validation for the two PINpads according to another embodiment of the present invention.

FIG. 5 illustrates the fueling environment 20' according to another embodiment of the present invention. In this embodiment, the fueling environment 20' includes the point-of-sale 22 and the fuel dispensers 26'-30'. However, unlike the embodiment of FIG. 2, this embodiment does not include the security module 24. As illustrated in the fuel dispenser 26', each of the fuel dispensers 26'-30' include fuel dispenser electronics 56 and a self-service terminal (SST) 58. The fuel dispenser electronics 56 includes a dispenser controller 60 that controls the printers 34A and 34B, the displays 40A and 40B, the soft keys 42A and 42B, the RFIDs 44A and 44B, the bar code readers 46A and 46B, and the cash acceptors 48A and 48B as commonly known in the art.

According to the illustrated embodiment of the present invention, each of the fuel dispensers 26'-30' also includes the SST 58. The SST 58 includes an EMV controller 62 and the card readers 36A and 36B and the PINpads 38A and 38B. The EMV controller 62 includes the SAMs and the bank keys such that the EMV controller 62 operates similarly to the security module 24 of FIG. 2. Accordingly, the EMV controller 62 operates to provide either off-line validation of a customer's PIN using the SAMs or on-line validation of the customer's PIN by encrypting the PIN using a corresponding bank key and communicating the encrypted PIN to a host computer (not shown) via the dispenser controller 60 and the POS 22, which act as gateways. The EMV controller 62 may also communicate with the dispenser controller 60 to logically control the displays 40A and 40B as described above.

Figure 6:
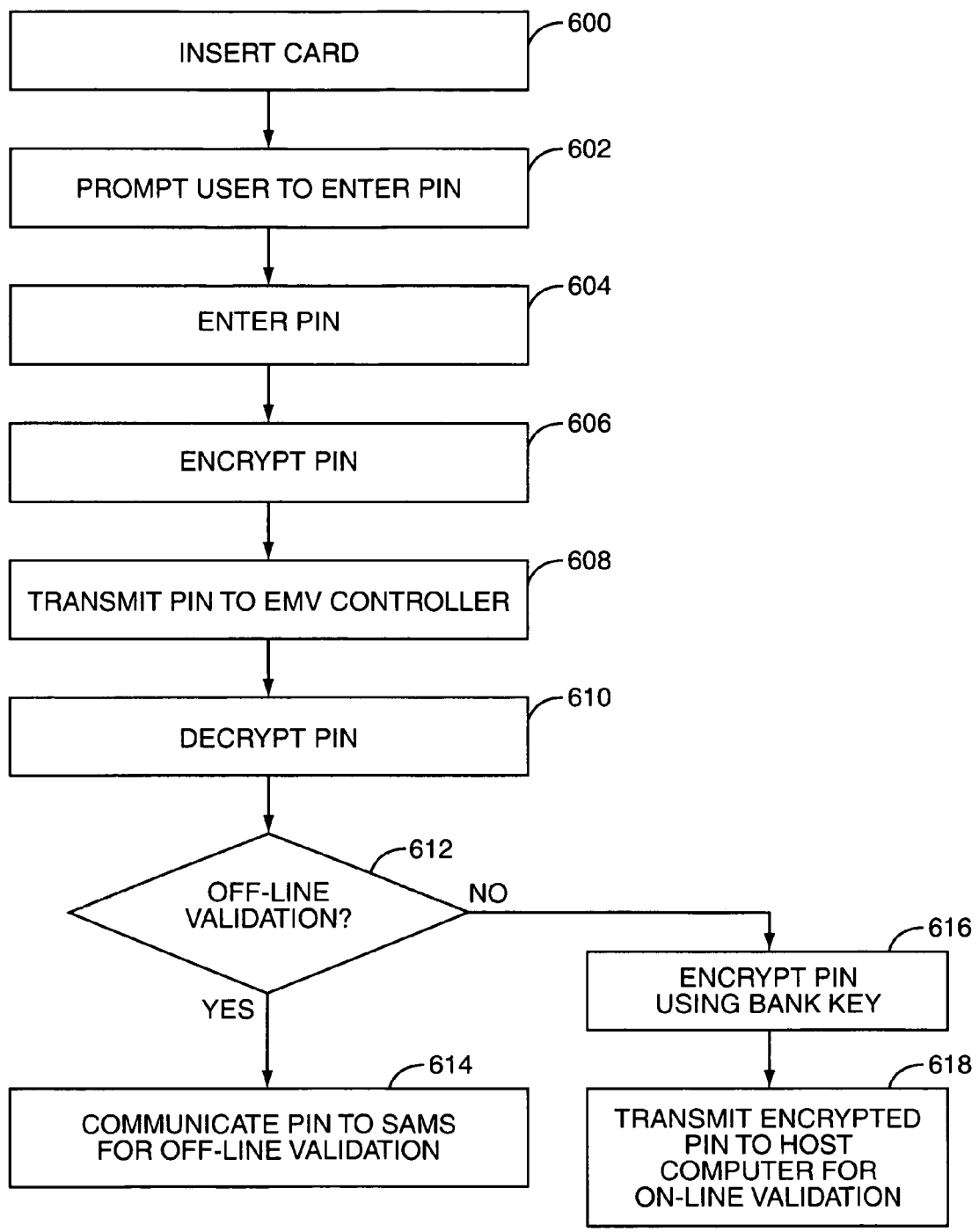
FIG. 6 is a flow chart illustrating the operation of the fuel dispensing environment of FIG. 5 according to one embodiment of the present invention.

As illustrated in FIG. 6, in operation, assuming a customer is purchasing fuel on the first side of the fuel dispenser 26', the customer inserts his smart card into the card reader 36A (step 600). The EMV controller 62 communicates with the dispenser controller 60 such that a message is displayed on the display 40A to prompt the customer to enter his PIN (step 602). The customer then enters his PIN using the PINpad 38A (step 604). The PINpad 38A encrypts the PIN (step 604) and communicates the encrypted PIN to the EMV controller 62 (step 608). Once the EMV controller 62 receives the encrypted PIN, it decrypts the PIN (step 610). The EMV then determines whether to perform off-line or on-line validation of the PIN (step 612). For off-line validation, the EMV controller 62 communicates the PIN to the SAMs for validation based on data read from the smart card by the smart card reader 36A (step 614). For on-line validation, after decrypting the PIN, the EMV controller 62 encrypts the PIN using a corresponding one of the stored bank keys (step 616) and communicates the PIN encrypted using the bank key to a host computer (not shown) via the dispenser controller 60 and the POS 22 for on-line validation based on data read from the smart card by the smart card reader 36A (step 618).

Referring back to FIG. 5, it should be noted that the retail environment 20' of FIG. 5 requires only one set of SAMs for each of the dispenser 26'-30' and one set of stored bank keys for each of the dispensers 26'-30'. In this embodiment, the SAMs are either incorporated into or securely interfaced to the EMV controller 62, and the bank keys are stored by the EMV controller 62 or alternatively stored in memory (not shown) securely interfaced to the EMV controller 62. In other words, the retail environment 20' avoids the need for a different set of SAMs for each of the PINpads 38A and 38B in each of the dispensers 26-30 and also avoids the need for storing the bank keys in each of the PINpads 38A and 38B in each of the dispensers 26-30.

In one embodiment, communication between the EMV controller 62 and the PINpads 38A and 38B and the card readers 36A and 36B utilize an encryption scheme similar to that disclosed in U.S. Pat. No. 5,384,850 and described above. However, this encryption scheme is exemplary and is not intended to limit the scope of the present invention. In general, whenever it is desirable to generate encryption keys, local zone sessions are initiated between the EMV controller and each of the PINpads 38A and 38B and the card readers 36A and 36B. Accordingly, different keys are generated for encrypted communication between the EMV controller 62 and each of the PINpads 38A and 38B and the card readers 36A and 36B. The keys generated during the local zone sessions may be used to encrypt communications using any number of encryption algorithms including, but not limited to, Rivest-Shamir-Adelman algorithm (RSA), the Diffie-Hellman algorithm (DH), the Data Encryption Standard (DES), or one or more of the RSA, DH, and DES algorithms. In one embodiment, the communications may be encrypted using DES using a unique key per transaction (UKPT) or a Master key and a Session key.

Those skilled in the art will recognize improvements and modifications to the preferred embodiments of the present invention. All such improvements and modifications are considered within the scope of the concepts disclosed herein and the claims that follow.

What is claimed is:

1. A validation system for customer transactions occurring in a retail environment, comprising:
    a) a security module comprising at least one secure access module (SAM), each of the at least one SAMs operating to perform off-line validation of a customer's personal identification number (PIN) associated with a smart card; and
    b) a plurality of customer terminals located apart from the security module, each of the plurality of customer terminals, comprising:
        i) a controller communicatively coupled to the security module;
        ii) a first card reader that reads data from the smart card and communicates the data to the controller; and
        iii) a first PINpad that allows the customer to enter a PIN and communicates the PIN to the controller; wherein the controller communicates the PIN to the security module and the security module provides the PIN to the at least one SAM which performs an off-line validation of the PIN based on the data.

2. The system of claim 1 wherein each of the plurality of customer terminals is a two-sided fuel dispenser and further comprises:
    a) a second card reader that reads second data from a second smart card and communicates the second data to the controller; and
    b) a second PINpad that allows a second user to enter a second PIN and communicates the second PIN to the controller;
    wherein the controller further communicates the second PIN to the security module and the security module provides the second PIN to the at least one SAM which performs an off-line validation of the second PIN based on the second data.

3. The system of claim 1 wherein the first PINpad encrypts the PIN using a first encryption key prior to transmitting the PIN to the controller.

4. The system of claim 3 wherein the first encryption key is derived based on an exponential key exchange between the security module and the first PINpad.

5. The system of claim 3 wherein the security module receives the PIN encrypted using the first encryption key from the controller and decrypts the PIN using the first encryption key.

6. The system of claim 3 wherein the second PINpad encrypts the second PIN using a second encryption key prior to transmitting the second PIN to the controller.

7. The system of claim 6 wherein the second encryption key is derived based on an exponential key exchange between the security module and the second PINpad.

8. The system of claim 6 wherein the security module receives the second PIN encrypted using the second encryption key from the controller and decrypts the second PIN using the second encryption key.

9. The system of claim 6 wherein communications between the first card reader and the controller are encrypted based on a third encryption key.

10. The system of claim 9 wherein the third encryption key is derived based on an exponential key exchange between the controller and the first card reader.

11. The system of claim 9 wherein communications between the second card reader and the controller are encrypted based on a fourth encryption key.

12. The system of claim 11 wherein the fourth encryption key is derived based on an exponential key exchange between the controller and the second card reader.

13. The system of claim 11 wherein communications between the first PINpad and the security module, the second PINpad and the security module, the first card reader and the controller, and the second card reader and the controller are encrypted based on the first, second, third, and fourth encryption keys, respectively, and one or more encryption algorithms selected from the group consisting of Rivest-Shamir-Adelman algorithm (RSA), the Diffie-Helman algorithm (DII), and the Data Encryption Standard (DES).

14. The system of claim 1 wherein the security module further comprises at least one bank key, and when on-line validation of the PIN is desired, the security module further operates to encrypt the PIN based on a select one of the at least one bank keys and communicate the encrypted PIN to a corresponding host computer for on-line validation.

15. The system of claim 1 further comprising a point-of-sale unit that establishes a communication path between the controller and the security module.

16. The system of claim 1 wherein each of the plurality of customer terminals further comprises a display.

17. The system of claim 16 wherein the controller further operates to logically control the display.

18. The system of claim 17 wherein the controller further operates to logically control the display such that only predefined messages are displayed on the display when the first PINpad operates in a non-secure mode.

19. The system of claim 1 wherein each of the plurality of customer terminals further comprises at least one component selected from the group consisting of a printer, an interrogator, a bar code reader, a cash acceptor, a proximity detector, and a coin acceptor and dispenser, wherein the controller further operates to control the at least one component.

20. The system of claim 1 wherein the first PINpad, the first card reader, and the controller are modular components.

21. The system of claim 1 wherein the first card reader further operates to read data from a magnetic stripe card.

22. A two-sided fuel dispenser, comprising:
a controller including at least one secure access module (SAM), each of the at least one SAMs operating to perform off-line validation of a customer's personal identification number (PIN) associated with a smart card;
a first card reader that reads first data from a first smart card associated with a first customer and communicates the first data to the controller;
a first PINpad that allows the first customer to enter a first PIN and communicates the first PIN to the controller;
a second card reader that reads second data from a second smart card associated with a second customer and communicates the second data to the controller;
and a second PINpad that allows the second customer to enter a second PIN and communicates the second PIN to the controller;
wherein the controller receives the first and second PINs and provides the first and second PINs to the at least one SAM which performs an off-line validation for the first PIN based on the first data and an off-line validation for the second PIN based on the second data.

23. The dispenser of claim 22 wherein the first PINpad encrypts the first PIN using a first encryption key prior to transmitting the first PIN to the controller.

24. The dispenser of claim 23 wherein the first encryption key is derived based on an exponential key exchange between the controller and the first PINpad.

25. The system of claim 23 wherein the controller receives the first PIN encrypted using the first encryption key from the first PINpad and decrypts the first PIN using the first encryption key.

26. The dispenser of claim 23 wherein the second PINpad encrypts the second PIN using a second encryption key prior to transmitting the second PIN to the controller.

27. The dispenser of claim 26 wherein the second encryption key is derived based on an exponential key exchange between the controller and the second PINpad.

28. The system of claim 26 wherein the controller receives the second PIN encrypted using the second encryption key from the second PINpad and decrypts the second PIN using the second encryption key.

29. The dispenser of claim 26 wherein communications between the first card reader and the controller are encrypted based on a third encryption key.

30. The dispenser of claim 29 wherein the third encryption key is derived based on an exponential key exchange between the controller and the first card reader.

31. The dispenser of claim 29 wherein communications between the second card reader and the controller are encrypted based on a fourth encryption key.

32. The dispenser of claim 31 wherein the fourth encryption key is derived based on an exponential key exchange between the controller and the second card reader.

33. The dispenser of claim 31 wherein communications between the first PINpad and the controller, the second PINpad and the controller, the first card reader and the controller, and the second card reader and the controller are encrypted based on the first, second, third, and fourth encryption keys, respectively, and one or more encryption algorithms selected from the group consisting of Rivest-Shamir-Adelman algorithm (RSA), the Diffie-Hellman algorithm (DH), and the Data Encryption Standard (DES).

34. The dispenser of claim 22 wherein the controller further comprises at least one bank key, and when on-line validation of the PIN is desired, the controller further operates to encrypt the PIN based on a select one of the at least one bank keys and communicate the encrypted PIN to a corresponding host computer for on-line validation.

35. The dispenser of claim 34 further comprising a point-of-sale unit communicatively coupled to the controller in each of the plurality of fuel dispensers and that establishes a communication path to the host computer.

36. The dispenser of claim 22 wherein each of the plurality of fuel dispensers further comprises: a first display; a second display; and a second controller communicatively coupled to the controller and the first and second displays and providing information to each of the first and second displays to be displayed.

37. The dispenser of claim 36 wherein the controller communicates with the second controller to logically control the first and second displays.

38. The dispenser of claim 37 wherein the controller communicates with the second controller to logically control the first and second displays such that only pre-defined messages can be displayed on the first and second displays when a corresponding one of the first and second PINpads operates in a non-secure mode.

39. The dispenser of claim 36 wherein each of the plurality of fuel dispensers further comprises at least one pair of components selected from the group consisting of a first and second printer, a first and second interrogator, a first and second bar code reader, a first and second cash acceptor, a first and second proximity detector, and a first and second coin acceptor and dispenser, wherein the second controller further operates to control the at least one pair of components.

40. The dispenser of claim 22 wherein the first and second PINpads, the first and second card readers, and the controller are modular components.

41. The dispenser of claim 22 wherein the first and second card readers further operates to read data from magnetic stripe cards.

42. A method of validating customer transactions occurring in a retail environment, comprising:
a) communicatively coupling a controller in each of a plurality of customer terminals to a security module comprising at least one secure access module (SAM), each of the at least one SAMs operating to perform off-line validation of a customer's personal identification number (PIN) associated with a smart card;
b) reading data from the smart card at a first card reader;
c) communicating the data to the controller;
d) receiving the customer's PIN at a PINpad;
e) communicating the PIN to the controller;
f) communicating the PIN from the controller to the security module; and
g) providing the PIN to the at least one SAM which performs an off-line validation of the PIN based on the data.

43. The method of claim 42 further comprising:
reading second data from a second smart card associated with a second customer at a second card reader;
communicating the second data to the controller;
receiving a second PIN from the second customer at a second PINpad;
communicating the second PIN to the controller;
communicating the second PIN from the controller to the security module; and providing the second PIN to the at least one SAM which performs an off-line validation of the second PIN based on the second data.

44. The method of claim 43 wherein the step of communicating the PIN to the controller comprising encrypting the PIN using a first encryption key prior to transmitting the PIN to the controller.

45. The method of claim 44 further comprising generating the first encryption key based on an exponential key exchange between the security module and the first PINpad.

46. The method of claim 44 wherein the step of providing the PIN to the at least one SAM comprises decrypting the PIN using the first encryption key.

47. The method of claim 44 wherein the step of communicating the second PIN to the controller comprises encrypting the second PIN using a second encryption key prior to transmitting the second PIN to the controller.

48. The method of claim 47 further comprising generating the second encryption key is derived based on an exponential key exchange between the security module and the second PINpad.

49. The method of claim 47 wherein the step of providing the second PIN to the at least one SAM comprises decrypting the second PIN using the second encryption key.

50. The method of claim 47 wherein the step of communicating the data to the controller comprises encrypting the data using a third encryption key prior to transmitting the data to the controller.

51. The method of claim 50 further comprising generating the third encryption key based on an exponential key exchange between the controller and the first card reader.

52. The method of claim 43 wherein the step of communicating the second data to the controller comprises encrypting the second data using a fourth encryption key.

53. The method of claim 52 further comprising generating the fourth encryption key based on an exponential key exchange between the controller and the second card reader.

54. The method of claim 52 wherein the steps of encrypting the PIN, encrypting the data, encrypting the second PIN, and encrypting the second data comprises encrypting the PIN, the data, the second PIN, and the second data based on the first, second, third, and fourth encryption keys, respectively, based one or more encryption algorithms selected from the group consisting of Rivest-Shamir-Adelman algorithm (RSA), the Diffie-Hellman algorithm (DH), and the Data Encryption Standard (DES).

55. The method of claim 42 wherein when on-line validation of the PIN is desired, the method further comprises: encrypting the PIN in the security module based on a select one of at least one bank keys; and communicating the encrypted PIN to a corresponding host computer for on-line validation based on the data.

56. The method of claim 42 further comprising establishing a communication path between the controller and the security module through a point-of-sale.

57. The method of claim 42 further comprising control a display in the customer terminal such that only pre-defined messages are displayed on the display when the first PINpad operates in a non-secure mode.

58. A method of validating customer transactions occurring at a two-sided fuel dispenser, comprising:
a) reading first data from a first smart card at a first card reader;
b) communicating the first data to a controller in the fuel dispenser, the controller comprising at least one secure access module (SAM), each of the at least one SAMs operating to perform off-line validation of a customer's personal identification number associated with a smart card;
c) receiving a first PIN associated with the first smart card at a first PINpad;
d) communicating the first PIN to the controller;
e) providing the first PIN to the at least one SAM which performs an off-line validation of the first PIN based on the first data;
f) reading second data from a second smart card at a second card reader;
g) communicating the second data to the controller;
h) receiving a second PIN associated with a second smart card at a second PINpad;
i) communicating the second PIN to the controller; and
j) providing the second PIN to the at least one SAM which performs an off-line validation of the second PIN based on the second data.

59. The method of claim 58 wherein the step of communicating the first PIN to the controller comprising encrypting the first PIN using a first encryption key prior to transmitting the first PIN to the controller.

60. The method of claim 59 further comprising generating the first encryption key based on an exponential key exchange between the controller and the first PINpad.

61. The method of claim 59 wherein the step of providing the first PIN to the at least one SAM comprises decrypting the first PIN using the first encryption key.

62. The method of claim 59 wherein the step of communicating the second PIN to the controller comprises encrypting the second PIN using a second encryption key prior to transmitting the second PIN to the controller.

63. The method of claim 62 further comprising generating the second encryption key is derived based on an exponential key exchange between the controller and the second PINpad.

64. The method of claim 62 wherein the step of providing the second PIN to the at least one SAM comprises decrypting the second PIN using the second encryption key.

65. The method of claim 62 wherein the step of communicating the first data to the controller comprises encrypting the first data using a third encryption key prior to transmitting the first data to the controller.

66. The method of claim 65 further comprising generating the third encryption key based on an exponential key exchange between the controller and the first card reader.

67. The method of claim 65 wherein the step of communicating the second data to the controller comprises encrypting the second data using a fourth encryption key.

68. The method of claim 67 further comprising generating the fourth encryption key based on an exponential key exchange between the controller and the second card reader.

69. The method of claim 58 wherein the steps of encrypting the first PIN, encrypting the first data, encrypting the second PIN, and encrypting the second data comprises encrypting the first PIN, the first data, the second PIN, and the second data based on the first, second, third, and fourth encryption keys, respectively, based one or more encryption algorithms selected from the group consisting of Rivest-Shamir-Adelman algorithm (RSA), the Diffie-Heilman algorithm (DH), and the Data Encryption Standard (DES).

70. The method of claim 58 wherein when on-line validation of the PIN is desired, the method further comprises:
encrypting the first and second PINs in the controller based on select ones of at least one bank key; and
communicating each of the encrypted first and second PINs to a corresponding host computer for on-line validation.

71. The method of claim 70 further comprising establishing a communication path to the host computer via a point-of-sale unit communicatively coupled to the controller in each of the plurality of fuel dispensers.

72. The method of claim 58 further comprising controlling a first display and a second display such that only pre-defined messages are displayed on the first and second displays when a corresponding one of the first and second PINpads operates in a non-secure mode.

* * * * *

UNITED STATES PATENT AND TRADEMARK OFFICE
CERTIFICATE OF CORRECTION

PATENT NO. : 7,607,576 B2 Page 1 of 1
APPLICATION NO. : 11/064526
DATED : October 27, 2009
INVENTOR(S) : Robertson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1224 days.

Signed and Sealed this

Twelfth Day of October, 2010

David J. Kappos
*Director of the United States Patent and Trademark Office*